(12) United States Patent
Watson et al.

(10) Patent No.: US 10,180,119 B2
(45) Date of Patent: Jan. 15, 2019

(54) SYSTEM AND METHOD OF IMPROVING FUEL EFFICIENCY IN VEHICLES USING HHO

(71) Applicant: The Hydrogen Group, Inc., Casselberry, FL (US)

(72) Inventors: Timothy Allen Watson, Bronson, FL (US); James Edward Lowe, Williston, FL (US); Armand Rene Dauplaise, Winter Springs, FL (US)

(73) Assignee: THE HYDROGEN GROUP, INC., Casselberry, FL (US)

( * ) Notice: Subject to any disclaimer, the term of this patent is extended or adjusted under 35 U.S.C. 154(b) by 182 days.

(21) Appl. No.: 15/225,287

(22) Filed: Aug. 1, 2016

(65) Prior Publication Data

US 2017/0037815 A1   Feb. 9, 2017

Related U.S. Application Data

(60) Provisional application No. 62/199,826, filed on Jul. 31, 2015.

(51) Int. Cl.
  *C25B 1/02*  (2006.01)
  *C25B 9/00*  (2006.01)
  (Continued)

(52) U.S. Cl.
  CPC ............... *F02M 25/12* (2013.01); *C25B 1/02* (2013.01); *C25B 9/00* (2013.01); *F02B 43/12* (2013.01);
  (Continued)

(58) Field of Classification Search
  CPC .. F02M 25/12; C25B 1/02; C25B 9/00; F02B 43/12; F02B 63/04; F02B 2043/106; Y02T 10/121
  (Continued)

(56) References Cited

U.S. PATENT DOCUMENTS 4,425,215 A * 1/1984 Henes ........................ C25B 9/20
                                                          204/258
4,594,990 A    6/1986 Batchelor
  (Continued)

FOREIGN PATENT DOCUMENTS

JP         2007050962      *   3/2007

OTHER PUBLICATIONS

"Alternative Fuel HHO Systems—Do They Actually Work?", http://www.squidoo.com/HHO_Gas_savings.

*Primary Examiner* — Joseph J Dallo
*Assistant Examiner* — Yi-Kai Wang
(74) *Attorney, Agent, or Firm* — Finney & Lange, P.A.

(57) ABSTRACT

A system and method of providing HHO gas to an internal combustion engine in a vehicle involves providing a liquid electrolyte solution to at least one HHO generator including an HHO generating structure having a plurality of parallel plates suspended in a fluid compartment. Residual electrolyte solution is separated from the HHO gas output by the HHO generator, and a quantity of the HHO gas is stored in a pressure tank at a pressure level exceeding an ambient atmospheric pressure. The HHO gas is electively delivered to an intake side of the internal combustion engine by a valve structure coupled to the pressure tank, which is controlled at least in part by a throttle signal of the internal combustion engine.

21 Claims, 17 Drawing Sheets

(51) Int. Cl.
  *F02B 43/10* (2006.01)
  *F02B 43/12* (2006.01)
  *F02B 63/04* (2006.01)
  *F02M 25/12* (2006.01)

(52) U.S. Cl.
  CPC ......... *F02B 63/04* (2013.01); *F02B 2043/106* (2013.01); *Y02T 10/121* (2013.01)

(58) Field of Classification Search
  USPC ........................................................... 123/3
  See application file for complete search history.

(56) References Cited

U.S. PATENT DOCUMENTS

| | | | | |
|---|---|---|---|---|
| 6,099,617 | A * | 8/2000 | Bennett | B60H 3/06 95/105 |
| 8,046,867 | B2 | 11/2011 | Field et al. | |
| 2002/0070123 | A1* | 6/2002 | Andrews | C01B 13/10 205/626 |
| 2007/0151846 | A1* | 7/2007 | Klein | C01B 3/00 204/237 |
| 2010/0288212 | A1* | 11/2010 | Williams | F02B 43/10 123/3 |
| 2011/0083637 | A1* | 4/2011 | Blount | F01C 1/3442 123/220 |
| 2011/0290201 | A1 | 12/2011 | Owens | |
| 2014/0014049 | A1* | 1/2014 | Watson | F02B 43/00 123/3 |

* cited by examiner

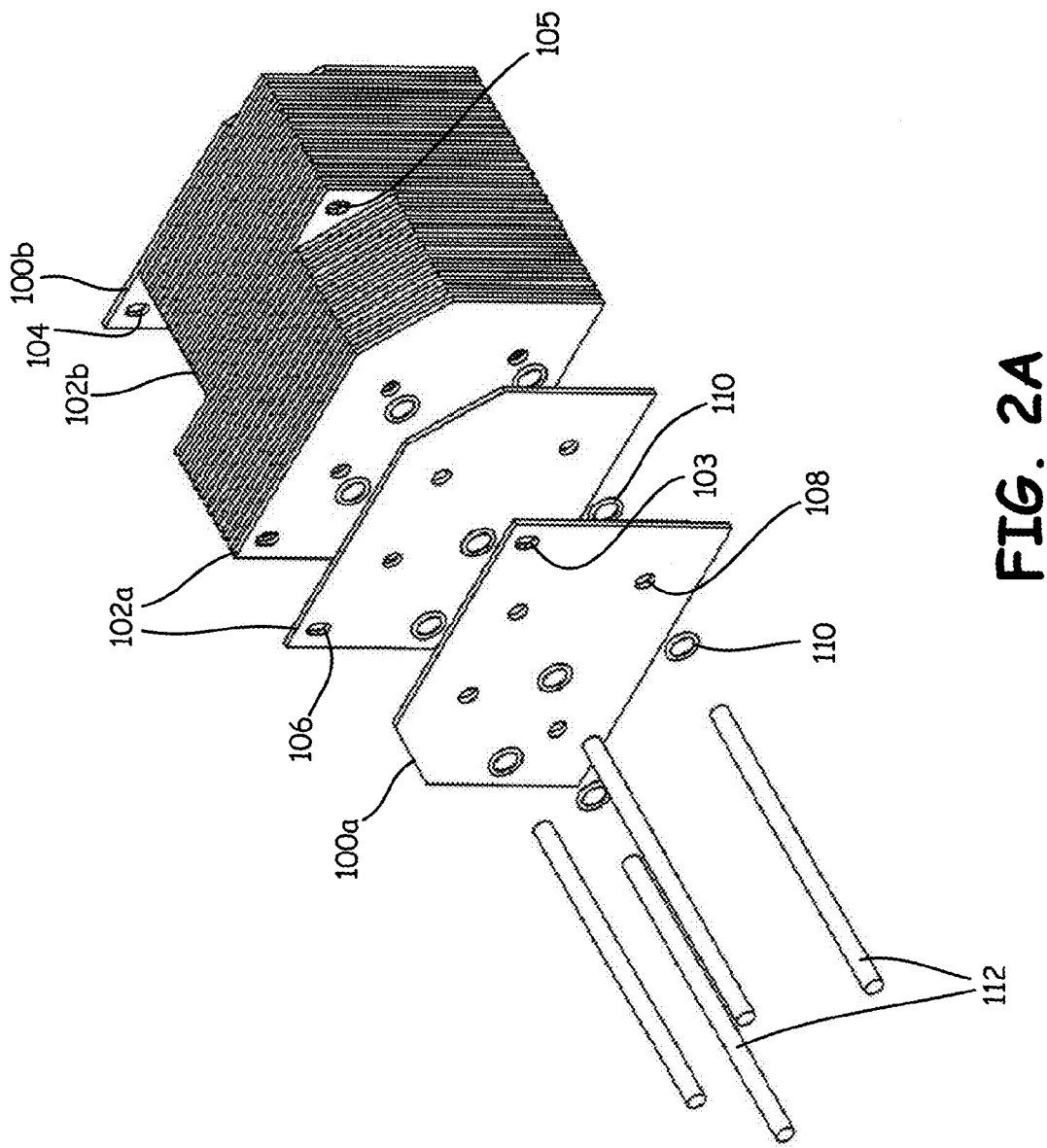

SYSTEM AND METHOD OF IMPROVING FUEL EFFICIENCY IN VEHICLES USING HHO

BACKGROUND

The present invention relates to a system that produces an HHO mix of fuel in vehicles that reduces exhaust emission and increases fuel efficiency.

There has been a continuing effort to improve the fuel efficiency of vehicles, in order to reduce fuel costs and/or emissions among other concerns. One concept that has been presented for improving fuel efficiency in vehicles employing gasoline-powered engines is to provide HHO (a gas consisting of two atoms of hydrogen and one atom of oxygen) to the engine. This concept has been believed to have the potential to increase fuel efficiency by causing the gasoline in the combustion chamber of the engine to burn more completely. However, the actual results of many systems of this type have shown small or no improvement in fuel efficiency.

There is a continuing need for a system and method of improving fuel efficiency in vehicles. Such a system and method is the subject of the present invention.

SUMMARY

A system for providing HHO gas to an internal combustion engine in a vehicle includes a power supply and at least one HHO generator configured to receive a liquid electrolyte solution and output HHO gas. The at least one HHO generator includes an HHO generating structure having a plurality of parallel plates suspended in a fluid compartment. A liquid solution and gas tank is coupled to the at least one HHO generator, is configured to hold the liquid electrolyte solution and to separate the HHO gas from residual liquid electrolyte solution output from the HHO generator, and to cooperate with a pump to pump the liquid electrolyte solution to the at least one HHO generator. A pressure tank is coupled to receive the HHO gas from the liquid solution and gas tank and store a quantity of the HHO gas at a pressure level exceeding an ambient atmospheric pressure. A valve structure is coupled to the pressure tank to selectively deliver the HHO gas to an intake side of the internal combustion engine based at least in part on a throttle signal of the internal combustion engine.

A method of providing HHO gas to an internal combustion engine in a vehicle includes providing a liquid electrolyte solution to at least one HHO generator having an HHO generating structure that includes a plurality of parallel plates suspended in a fluid compartment and configured to produce and output HHO gas therefrom. Residual electrolyte solution from the HHO gas output by the HHO generator is separated, and a quantity of the HHO gas is stored in a pressure tank at a pressure level exceeding an ambient atmospheric pressure. A flow of HHO gas from the pressure tank to the internal combustion engine is controlled with a valve structure that is controlled at least in part by a throttle control signal of the internal combustion engine.

BRIEF DESCRIPTION OF THE DRAWINGS

FIG. 2A is an exploded view.

DETAILED DESCRIPTION

Embodiments of a system that produces an HHO mix of fuel in vehicles that reduces exhaust emission and increases fuel efficiency are described in detail below.

First Embodiment

Figure 1A:
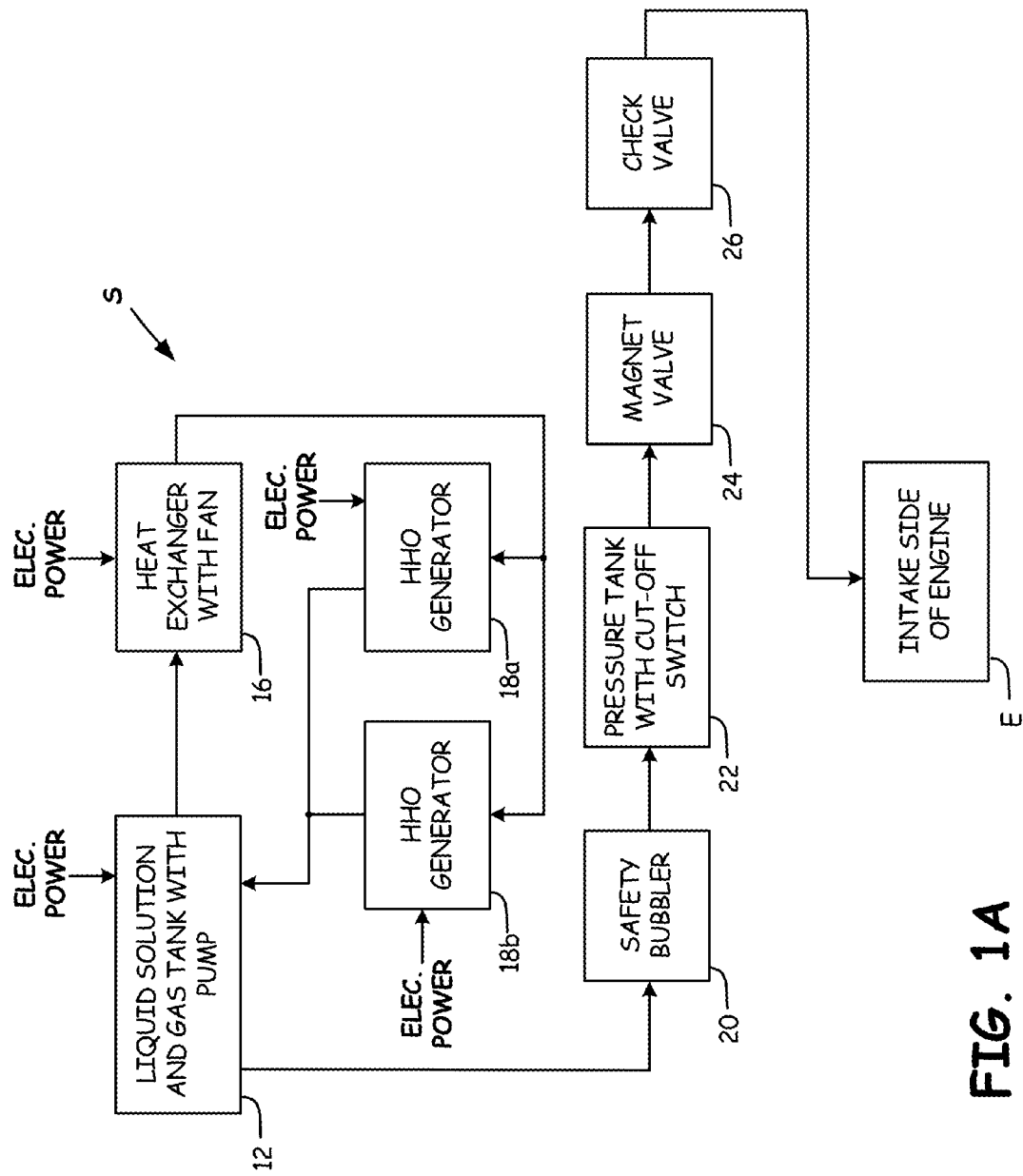
FIG. 1A is a schematic block diagram.
Figure 1B:
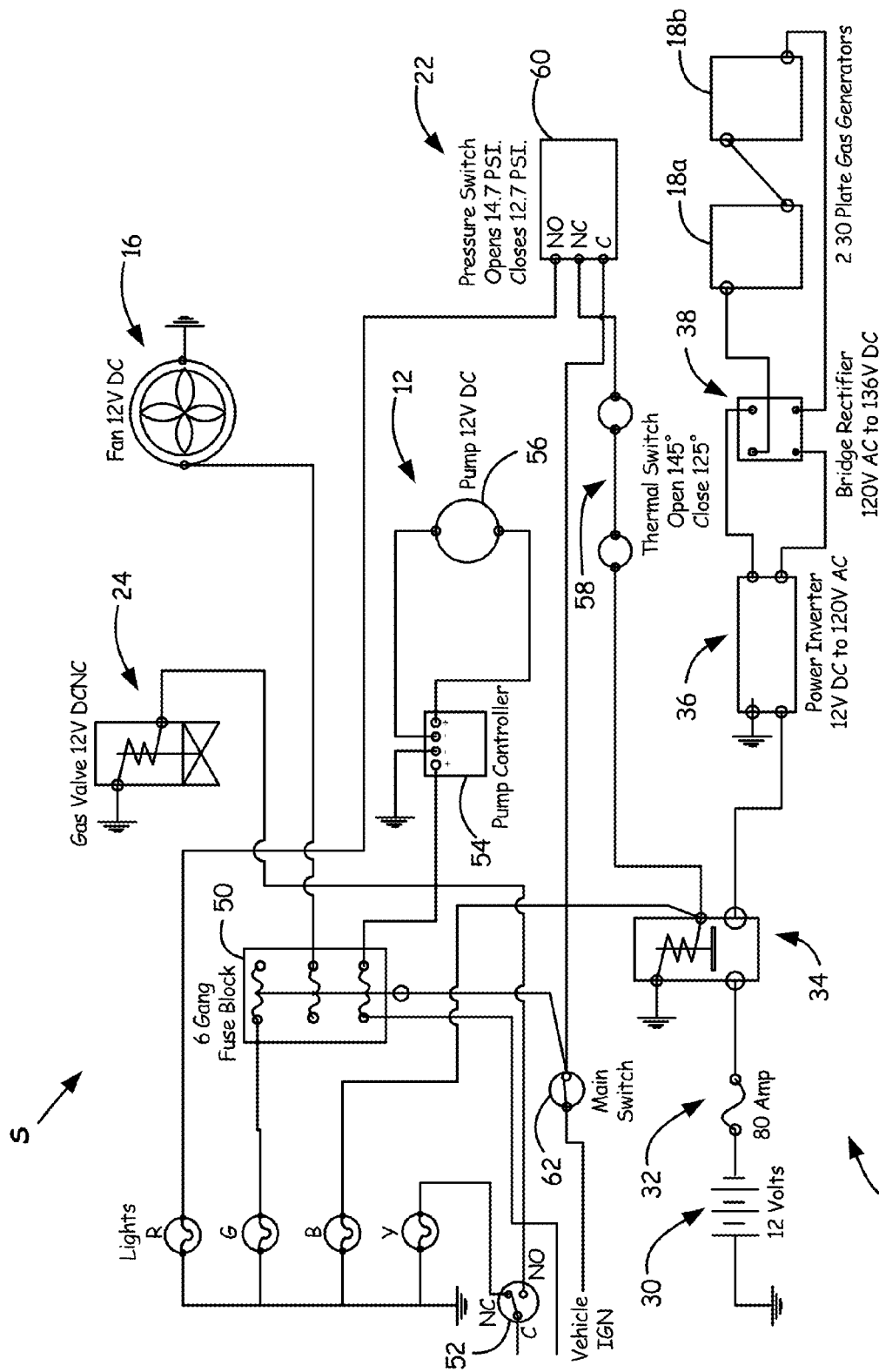
FIG. 1B is an electrical schematic diagram, of a system that produces an HHO mix of fuel in vehicles that reduces exhaust emission and increases fuel efficiency according to an embodiment of the present invention.

FIG. 1A is a schematic block diagram, and FIG. 1B is an electrical schematic diagram, of system S that produces an HHO mix of fuel in vehicles that reduces exhaust emission and increases fuel efficiency according to an embodiment of the present invention. As shown in FIG. 1A, the system includes liquid and gas solution tank 12 (including a pump), heat exchanger with fan 16, HHO generators 18a and 18b, safety bubbler 20, pressure tank 22 with a cut-off switch, magnet valve 24 (such as a solenoid), and check valve 26. As shown in FIG. 1B, electrical power supply 28 in an exemplary embodiment includes battery 30, fuse 32 and solenoid 34, which are connected through power inverter 36 and bridge rectifier 38 to provide power to HHO generators 18a and 18b. Power supply 28 also provides power to other components of system S via fuse block 50, including intake manifold switch 52, magnet valve 24, heat exchanger 16 (illustrated in FIG. 1B as a fan for a radiator, for example), pump controller 54 and pump 56 of liquid and gas solution tank 12, thermal switch 58, and pressure cut-off switch 60 (which is part of pressure tank 22). These components receive 12 volt electrical power, while HHO generators 18a and 18b receive a higher level of power for charging their steel plates, as explain in more detail below. Main switch 62 is provided to enable the system only when the vehicle is running. Indicator lights R, G, B and Y are provided to indicate an overpressure condition, the status of current through fuse block 50, the status of the ignition/gas system of the vehicle, and the status of the engine (whether it is idling), respectively.

In operation of the exemplary embodiment shown in FIGS. 1A and 1B, 136 volt DC power is supplied to HHO generators 18a and 18b. HHO generators 18a and 18b may be implemented as series connected suspended steel plates in a fluid cell in an exemplary embodiment, and is shown and described in more detail below with respect to FIGS. 2A, 2B and 3-5.

Liquid electrolyte solution, such as a solution of 95% water and 5% potassium hydroxide (KOH) by volume in an exemplary embodiment, is pumped from liquid solution and gas tank 12 through heat exchanger 16 that helps to cool the solution. In an exemplary embodiment, heat exchanger 16 may include a radiator/fan assembly that starts when the system is activated, and cools the entire system. For example, the liquid solution may be cooled below 115° F. in one embodiment. The liquid solution then flows into HHO generators 18a and 18b. HHO generators 18a and 18b are configured so that the liquid solution flows over charged core plates to break the chemical bonds of the water ($H_2O$) into a gas (HHO) made up of two parts hydrogen and one part oxygen. In an exemplary embodiment, the core plates are made of grade 316L stainless steel and are charged with 6 Ampere current by 136 Volt DC power from bridge rectifier 38. After treatment in HHO generators 18a and 18b, the HHO gas (as well as any residual liquid solution) flows back into liquid solution and gas tank 12. The gaseous HHO alternative fuel is then separated from the liquid solution, such as by a filter, with the residual liquid solution settling to a lower part of the liquid solution and gas tank 12 while HHO gas moves upward in the tank, such as through a one-way valve. The HHO gas then proceeds through safety bubbler 20. Safety bubbler 20 helps to prevent explosive flashback events from migrating back toward the components of system S. Safety bubbler 20 performs this function by bubbling the HHO mixture through a non-flammable liquid, so that flashback from any source is arrested.

Once HHO gas has passed through safety bubbler 20, the HHO gas then flows into pressure tank 22, where a small amount of pressure and a volume of gaseous fuel are accumulated, stored at a pressure that exceeds the ambient atmospheric pressure. A cut-off switch (pressure switch 60, FIG. 1B) installed with pressure tank 22 automatically shuts off the flow of fuel when a pressure threshold is reached in pressure tank 22, such as at about 15 psi in one embodiment. Pressure is applied to fuel in pressure tank 22 to ensure that adequate HHO alternative fuel reserves are maintained and a steady and constant flow can be achieved.

Fuel flow from pressure tank 22 is controlled by magnet valve 24, which is implemented as a solenoid valve in an exemplary embodiment. Magnet valve 24 is controlled to open in response to the acceleration demand status of engine E, via a signal provided from intake manifold switch 52. The magnet valve closes when engine E comes to an idle, and the gas pressure builds until the pressure in pressure tank 22 reaches 15 pounds per square inch (psi), or magnet valve 24 opens again when engine E rises above idle. The volume of gas provided to the engine intake increases as the demand for fuel consumption increases. In one example, when magnet valve 24 is opened, the system may provide about 0.5 liters per minute of HHO for every liter of displacement of the engine E. Thermal switch 58 includes two thermal switches in the embodiment shown in FIG. 1B, including a first switch that opens when the temperature of the system reaches 145° C. to protect the system from overheating, then resets when the system cools below 125° C. Main switch 62 automatically discontinues power to system S when a vehicle ignition key controlling engine E is turned off, and reconnects power to system S when the vehicle ignition key controlling engine E is turned on. In the manner described above, engine E is supplied with alternative fuel that improves the efficiency at which fuel is burned and consumed.

In an embodiment where engine E is a gasoline-powered engine, an additional optional safety bubbler may be provided just before HHO fuel reaches engine E to prevent flashback from the engine. This component is not needed in most embodiments in which engine E is a diesel-powered engine.

As the intake valve of engine E opens, pressurized gas (HHO alternative fuel) from pressure tank 22 starts filling the cylinder of engine E along with fresh air from the air filter. Gasoline or diesel fuel is also provided to the cylinder, although the addition of the HHO alternative fuel means that some amount of gasoline or diesel fuel is replaced by the HHO alternative fuel; that is, less gasoline or diesel fuel is provided to the cylinder than would normally be provided. The hydrogen provided to the cylinder (in the HHO alternative fuel) promotes a complete burn of all of the fuel in the combustion chamber, and the oxygen provided to the cylinder (in the HHO alternative fuel) promotes combustion and gives higher fuel efficiency. As a result, higher output power is obtained from the engine with less gasoline or diesel fuel being used.

While two HHO generators 18a and 18b are shown, in some embodiments a single HHO generator may be used, while in other embodiments a greater number of HHO generators may be used.

Figure 2B:
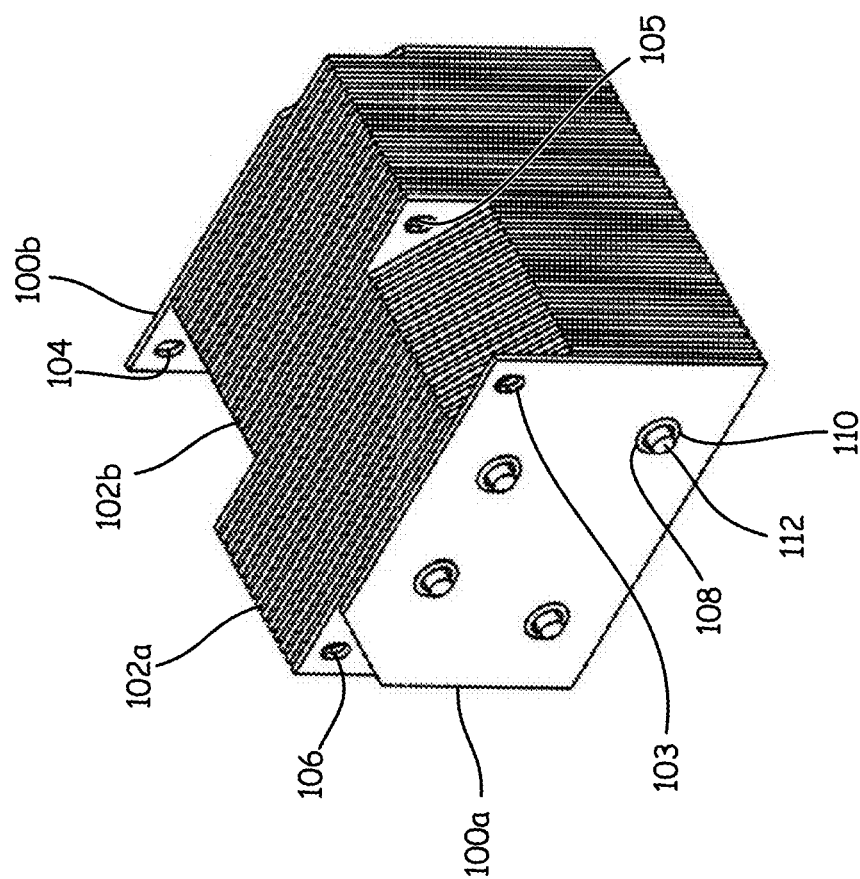
FIG. 2B is an assembled view, of an HHO generating structure positioned in an interior of HHO generators to produce HHO gas from a liquid solution.

FIGS. 2A, 2B and 3-5 are diagrams illustrating an exemplary embodiment of an HHO generating structure for HHO generators 18a and 18b used in system S shown in FIGS. 1A and 1B. Specifically, FIG. 2A is an exploded view, and FIG. 2B is an assembled view, of an HHO generating structure positioned in an interior of HHO generators 18a and 18b to produce HHO gas from a liquid solution. The exemplary HHO generating structure shown in FIGS. 2A and 2B includes grade 316L stainless steel end plates 100a and 100b and a plurality of grade 316L stainless steel plates 102a and 102b therebetween. End plate 100a includes aperture 103 that is aligned with apertures 105 in plates 102b, and end plate 100b includes aperture 104 that is aligned with apertures 106 in plates 102a. All of the plates include apertures 108 that are aligned, to allow rods 112 to extend through them with nylon spacers 110 around the rods, separating the plates from one another. Plates 102a are rotated 180 degrees from plates 102b. Plates 100a, 100b, 102a and 102b are charged with current, for example with 544 Watts of power, so that molecules of water in the liquid solution passed through the HHO generator are broken apart into hydrogen and oxygen via electrolysis.

Figure 3:
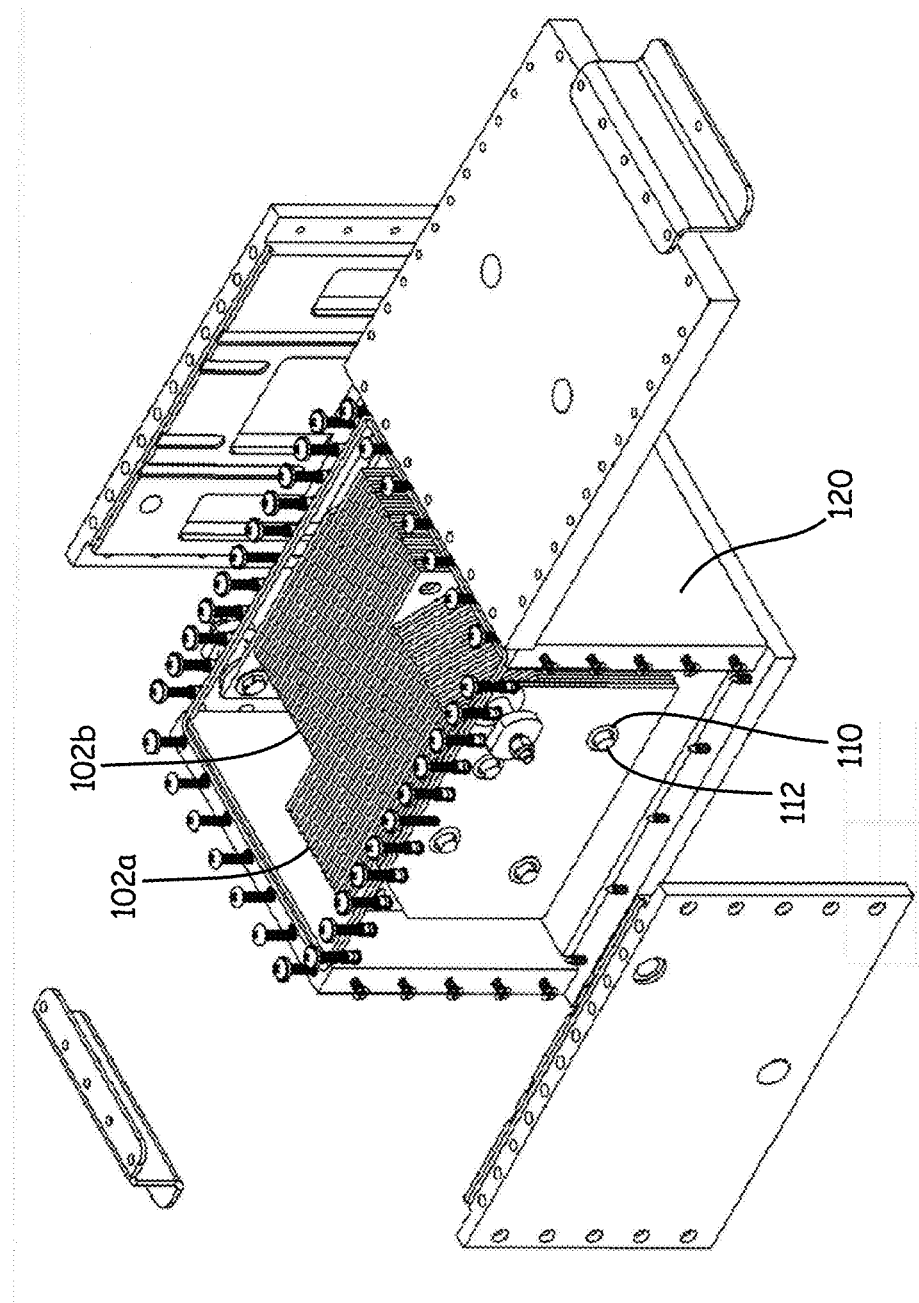
FIG. 3 is perspective view.
Figure 5:
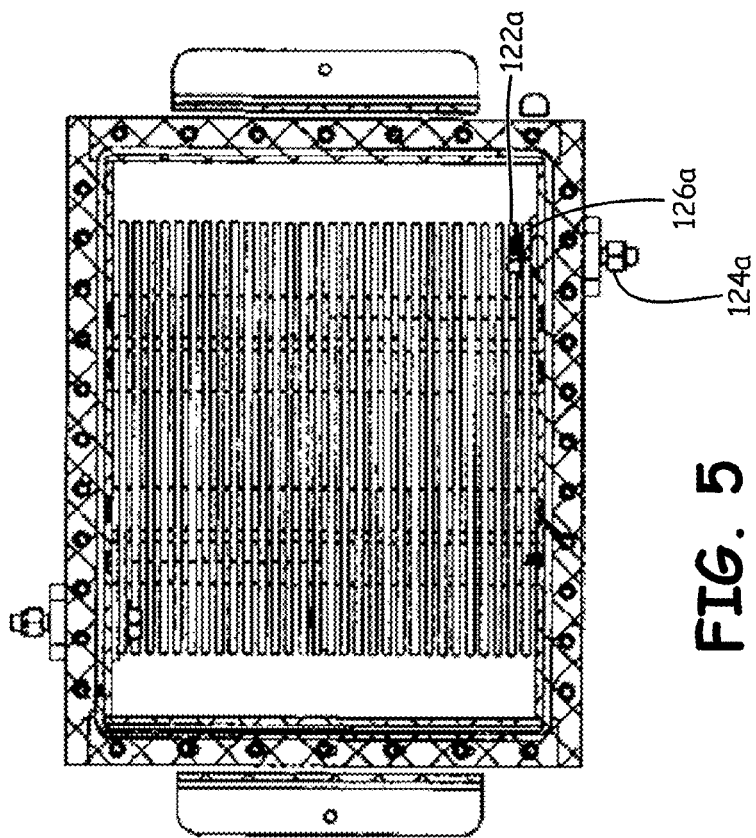
FIG. 5 is a top section view of an exemplary embodiment of an HHO generating structure for HHO generators used in the system shown in FIGS. 1A and 1B.
Figure 4:
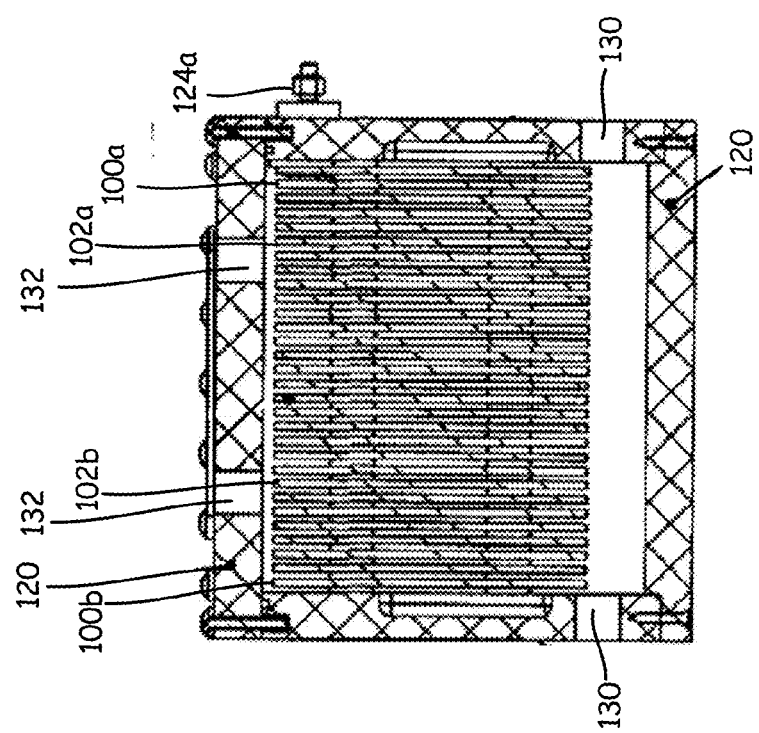
FIG. 4 is a side section view.

FIGS. 3, 4 and 5 are diagrams illustrating the mounting of the HHO generating structure shown in FIGS. 2A and 2B in a fluid compartment. Specifically, FIG. 3 is a perspective view, FIG. 4 is a side section view, and FIG. 5 is a top section view. Stainless steel plates 100a, 100b, 102a and 102b are positioned inside compartment 120. Rods 112 extend through plates 100a, 100b, 102a and 102b to hold them together in a suspended position in compartment 120. End plates 100a and 100b are secured to the walls of compartment 120. As shown in FIGS. 4 and 5, end plate 100a is secured to the wall of compartment 120 by bolt 122a, nut 124a and washer 126a. Other fastening systems or mechanisms may be used in alternative embodiments.

Stainless steel plates 100a, 100b, 102a and 102b are suspended within compartment 120 in order submerge plates 100a, 100b, 102a and 102b in fluid in the interior of compartment 120, to allow the fluid to make extensive contact with the surface area of plates 100a, 100b, 102a and 102b. For example, in one embodiment, fluid may fill approximately 80% of the volume of compartment 120, submerging a large portion of plates 100a, 100b, 102a and 102b in the fluid. Fluid may enter compartment 120 through apertures 130, and HHO gas may exit compartment 120 through apertures 132, in an exemplary embodiment. This configuration provides an efficient mechanism for the electrolysis effect that breaks apart the molecules of water in the liquid solution provided to compartment 120 into hydrogen and oxygen. In an exemplary system, each HHO generating structure may be capable of producing about 7 liters of HHO gas per minute.

The configuration of stainless steel plates 100a, 100b, 102a and 102b is such that these plates are functionally parallel to one another (as opposed to being arranged in series). In other words, each plate is exposed to fluid within compartment 120 at the same time, and current is applied to each plate in parallel. This is achieved by providing input power of 136 volts DC (in an exemplary embodiment) from bridge rectifier 38 (FIG. 1B), which allows 4 Ampere current to flow to plates 100a, 100b, 102a and 102b so that electrolysis can be performed with a high degree of efficiency.

Figure 6:
FIGS. 6-13 are photographs of a prototype of a system that produces an HHO mix of fuel in vehicles that reduces exhaust emission and increases fuel efficiency, installed on a vehicle according to an embodiment of the present invention.
Figure 7:
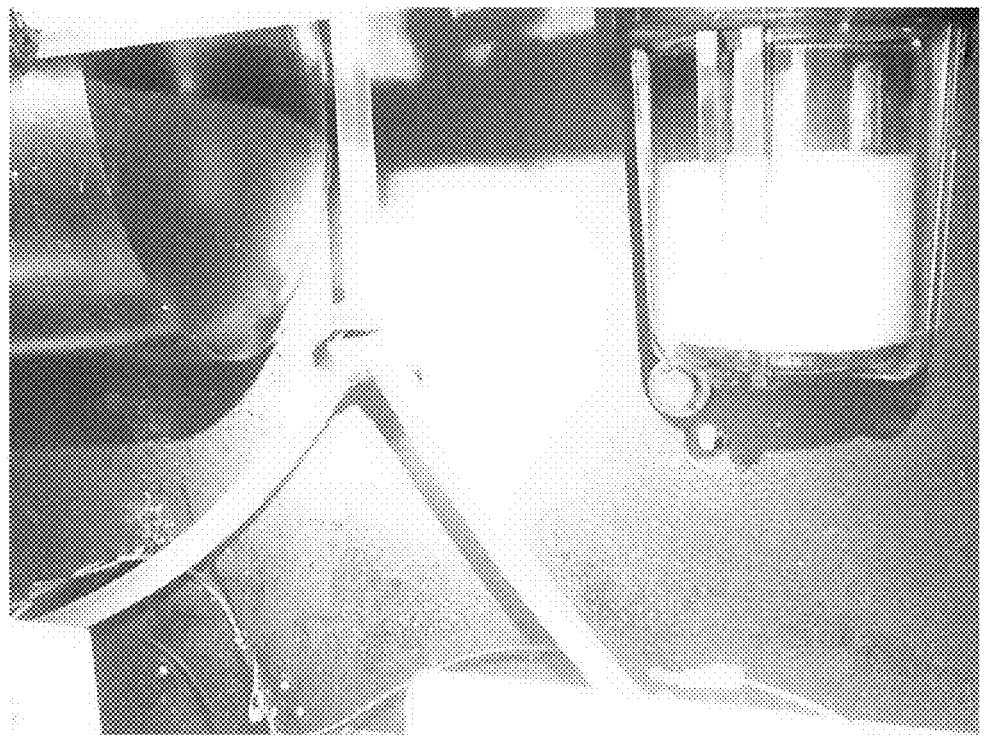
Figure 8:
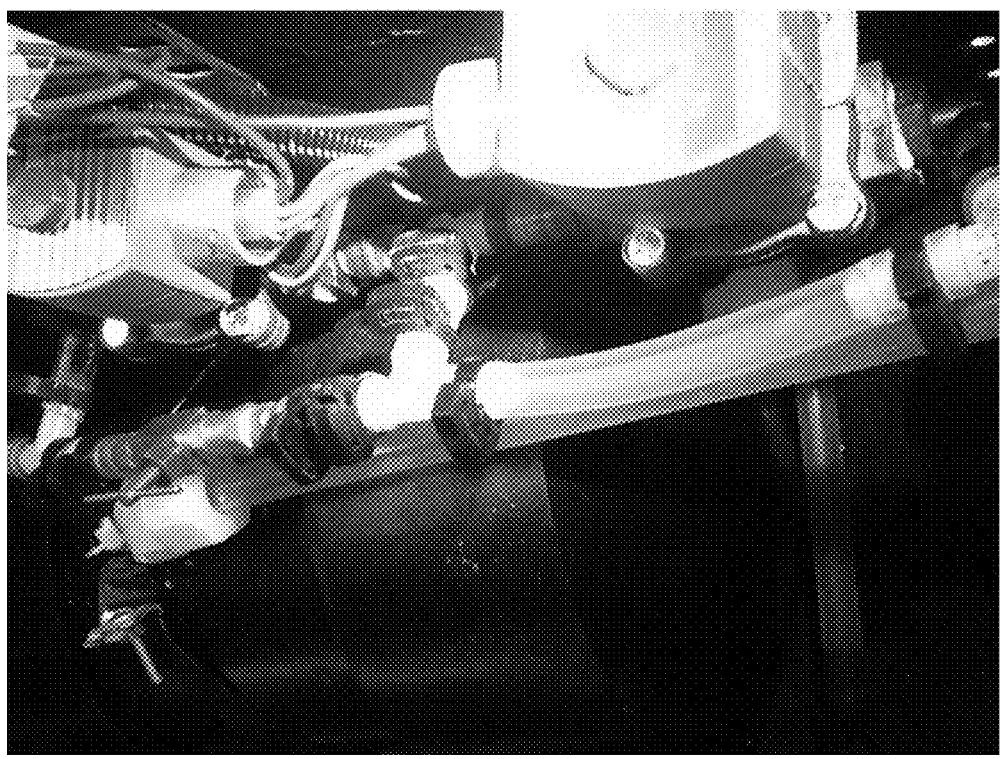
Figure 9:
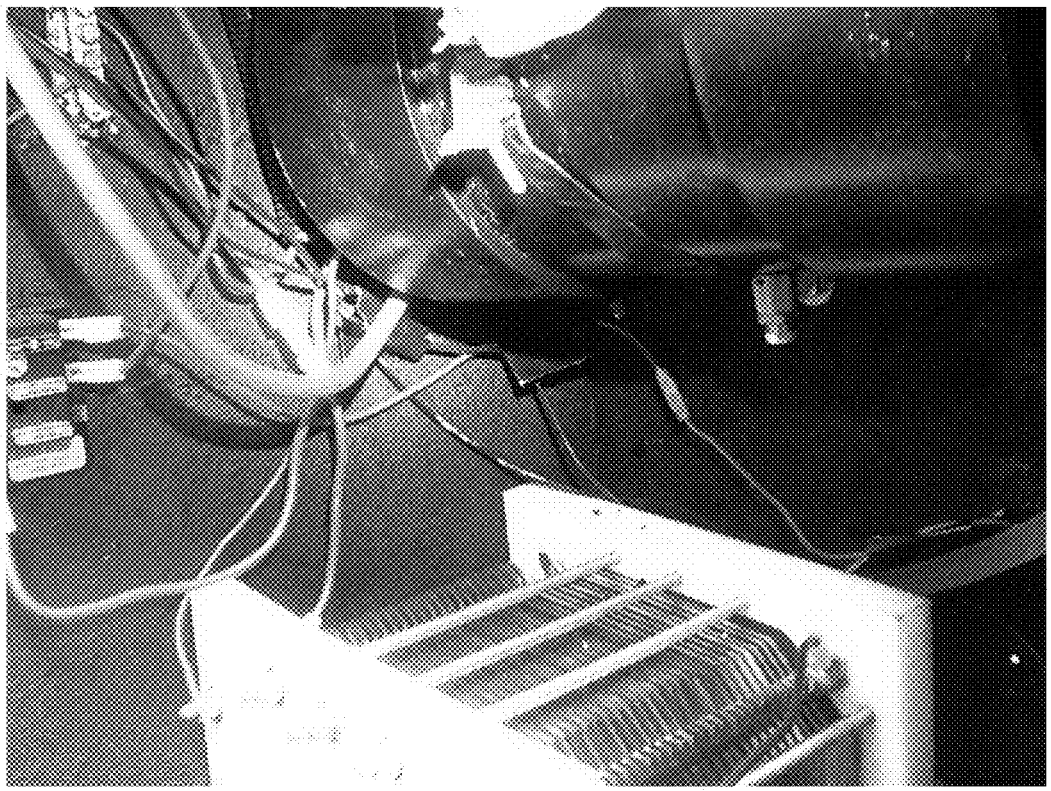
Figure 10:
Figure 11:
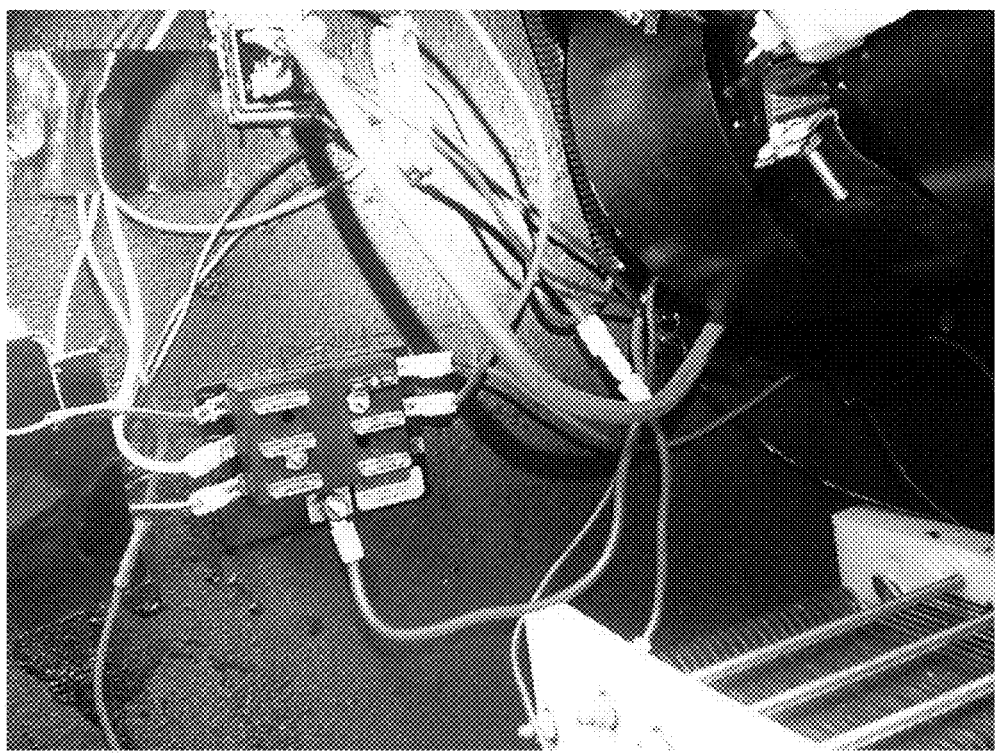
Figure 12:
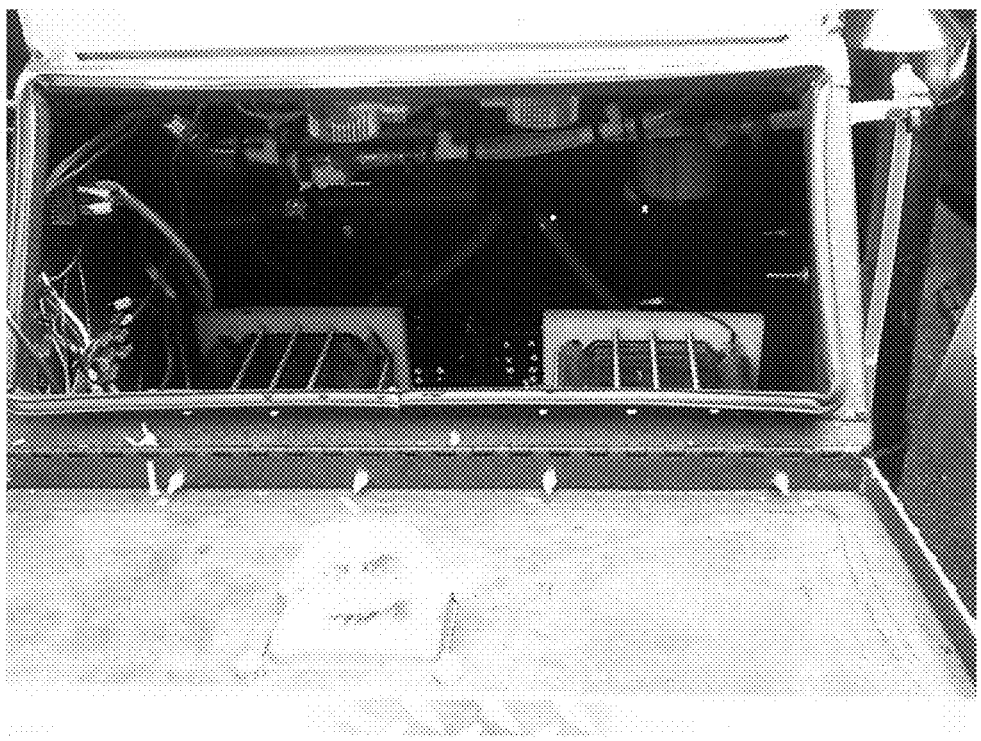
Figure 13:

FIGS. 6-13 are photographs of a prototype of system S that produces an HHO mix of fuel in vehicles that reduces exhaust emission and increases fuel efficiency, installed on a vehicle according to an embodiment of the present invention. The prototype shown in FIGS. 6-13 was found to be capable of improving fuel efficiency of the vehicle by a substantial amount. Road testing of the prototype shown in FIGS. 6-13 was done under various conditions and times, and the routes varied from state and federal highways. The physical components of the prototype include the components shown in FIGS. 1A, 1B, 2A, 2B and 3-5 described above. The components are assembled together and are not all visible in FIGS. 6-13, but they are functionally connected as described above. Specifically visible in the photograph of FIG. 6 is an HHO generator in the system, in the photograph of FIG. 7 is the return line, in FIG. 8 is the shutoff valve, in FIG. 9 is the pressure tanks, in FIG. 10 is the heat exchanger, in FIG. 11 is the fuse block, in FIG. 12 is the housing box of the system, and in FIG. 13 is the installation of the system in a truck.

By installing the system S that produces an HHO mix of fuel in vehicles that reduces exhaust emission and increases fuel efficiency in line with the fresh air intake of a vehicle, the burning of fossil fuel in the engine E of the vehicle is enhanced. With the enhancement of the burning process, waste of fossil fuel is reduced (fuel that is typically left unburned is completely burned, thus used for propulsion). The invention improves the miles per gallon of diesel- and gasoline-powered vehicles, which saves money, improves the environment and reduces dependence upon foreign oil imports. The invention produces an HHO mix of alternative fuel that is two parts hydrogen and one part oxygen, which results in reduced exhaust emission. Approximately 60 percent of the fuel used in existing vehicles is wasted through heat or exhaust emission. The introduction of hydrogen enables the invention to reclaim a certain amount of that waste and utilize it in the propulsion of the vehicle. This increase of fuel efficiency results in a substantial increase in fuel mileage as well as an increase in vehicle horsepower.

System S employs a storage tank and flow control for an HHO on-demand system, to provide a continuous, controlled flow of HHO gas to engine E. In many embodiments, the control of the HHO gas flow can be an important factor in achieving fuel efficiency improvement.

Adding HHO allows the engine to run in a leaner fuel/air condition. Without adding HHO, the stoichiometric ratio of fuel/air is 1 to 14.7 by mass. With HHO added, the engine can run at a fuel/air ratio of 1 to 20 or more. The presence of HHO acts much like a rectifier or reformer in that it helps the heavy fuel molecules to burn more completely than without HHO. The small amount of HHO inserted into the engine puts the otherwise unburned fuel into use, thus shifting the conventional fuel/air stoichiometry to a leaner condition.

Example Data

Testing of the system described herein was performed with a diesel semi tractor and trailer, where a prototype was installed and measurements were taken during road tests over various periods of time covering thousands of miles. The vehicle used was a 2005 International i-9200 semi tractor and trailer with a Cummins e-450 engine and a 10 speed automatic transmission. The performance of the system was as shown below in Table 1:

TABLE 1

| | HHO? | Loaded/ Empty | Miles Driven | Fuel used (gallons) | Miles per gallon | Emissions (before) | Emissions (after) | Change |
|---|---|---|---|---|---|---|---|---|
| Baseline 1 | No | Loaded | 705 | 157 | 4.4 | 6 ppm | 1 ppm | N/A |
| Trial 1 | Yes | Loaded | 670 | 129 | 5.2 | 6 ppm | 1 ppm | 16.5% |
| Trial 2 | Yes | Empty | 674 | 131 | 5.1 | | | 15.0% |
| Trial 3 | Yes | Loaded | 669 | 144 | 4.7 | 10 ppm | 1 ppm | 4.0% |
| Trial 4 | Yes | Loaded | 339 | 63 | 5.4 | | | 20.6% |
| Trial 5 | Yes | Empty | 340 | 55 | 6.1 | | | 36.5% |
| Baseline 2 | No | Loaded | 668 | 134 | 4.9 | | | N/A |
| Trial 6 | Yes | Empty | 662 | 96 | 6.9 | | | 35.3% |
| Trial 7 | Yes | Loaded | 648 | 113 | 5.7 | | | 16.3% |
| Baseline 3 | No | Empty | 660 | 132 | 4.9 | 4 ppm | 2 ppm | N/A |
| Baseline 4 | No | Loaded | 664 | 129 | 5.1 | 5 ppm | 3 ppm | N/A |
| Trial 8 | Yes | Empty | 660 | 120 | 5.5 | | | 10.9% |
| Trial 9 | Yes | Empty | 658 | 103 | 5.8 | 0 ppm | 0 ppm | 18.4% |
| Trial 10 | Yes | Loaded | 649 | 110 | 5.9 | 0 ppm | 0 ppm | 15.7% |
| Trial 11 | Yes | Loaded | 648 | 121 | 5.4 | 0 ppm | 0 ppm | 5.9% |
| Trial 12 | Yes | Loaded | 648 | 102 | 6.3 | 0 ppm | 0 ppm | 23.5% |

In Table 1 above, the "change" column refers to the change in miles per gallon for a trial (using HHO) compared to the most recent baseline (not using HHO). However, for Trails 8-12, the "change" column refers to the change in miles per gallon for each trial compared to either Baseline 3 or 4, depending on whether the trial was for an empty truck (in which case the "change" column refers to the change in comparison to Baseline 3) or for a loaded truck (in which case the "change" column refers to the change in comparison to Baseline 4).

Also, in the table above, some of the trials and baseline testing runs included a comparison of emissions before HHO was added to the fuel mixture and after HHO was added, in order to determine the effect that the addition of HHO had on emissions. In each testing instance, the addition of HHO reduced the level of emissions (where such emissions were present before the addition of HHO).

Second Embodiment

Figure 14A:
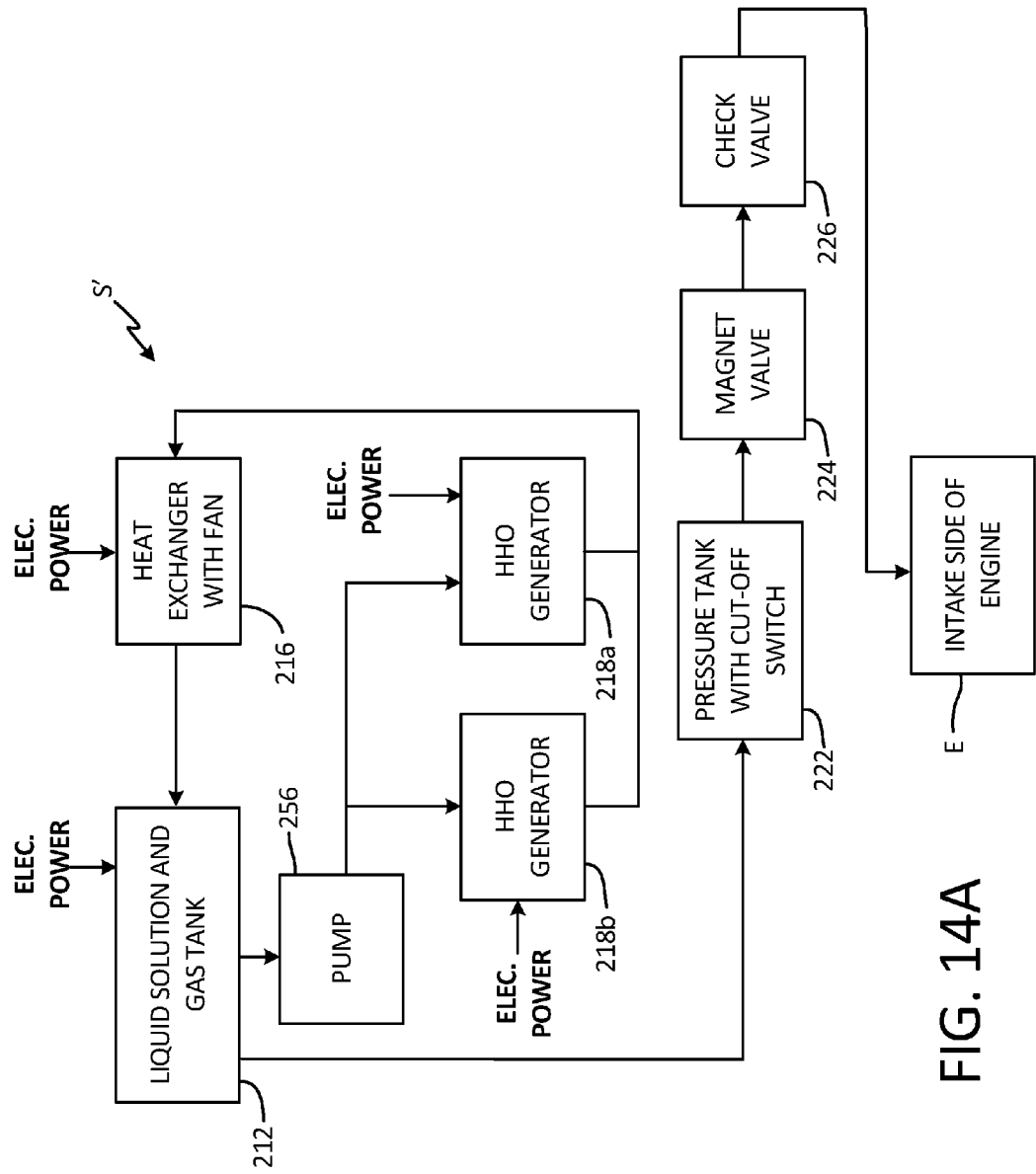
FIG. 14A is a schematic block diagram.
Figure 14B:
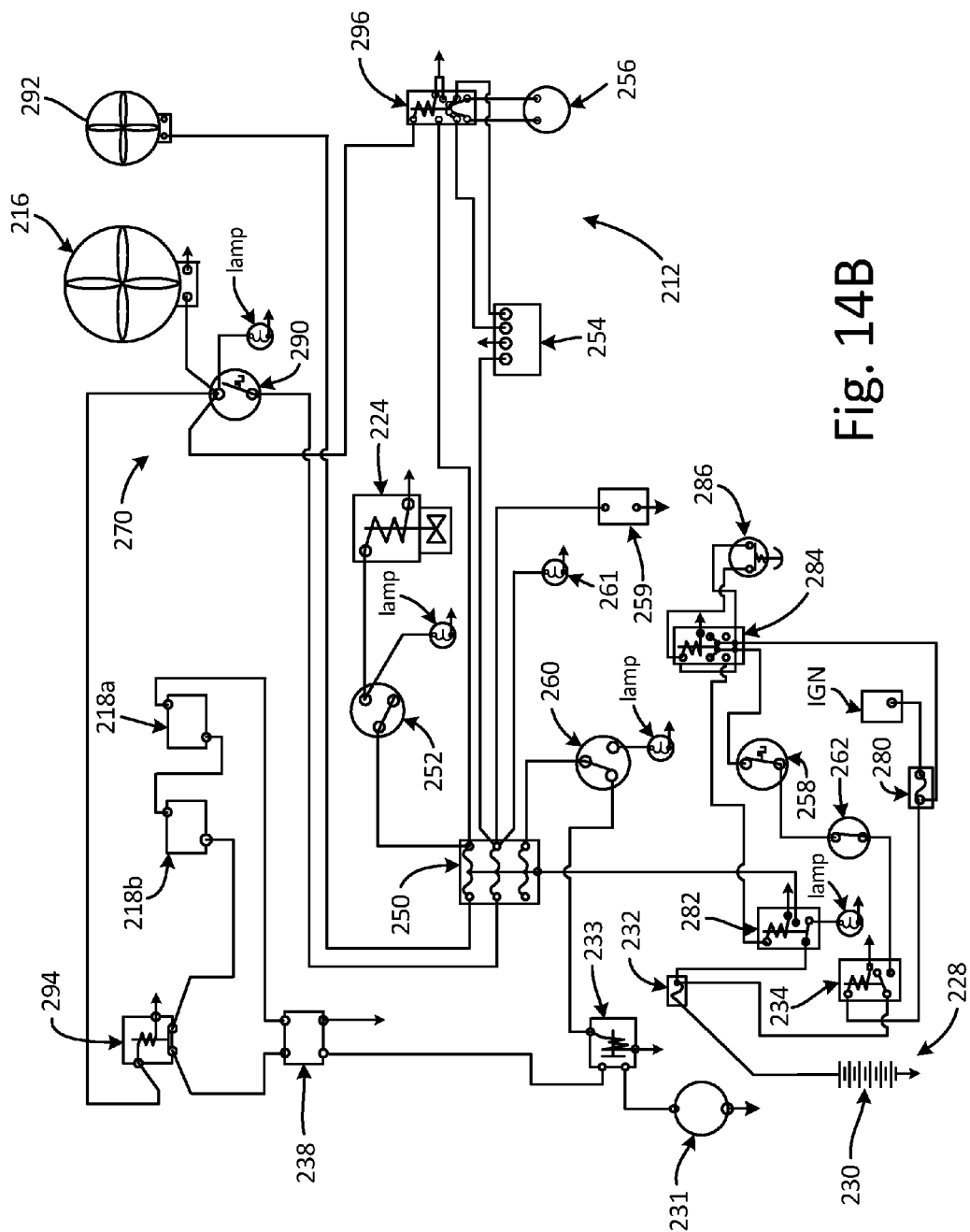
FIG. 14B is an electrical schematic diagram, of a system that produces an HHO mix of fuel in vehicles that reduces exhaust emission and increases fuel efficiency according to another embodiment of the present invention.

FIG. 14A is a schematic block diagram, and FIG. 14B is an electrical schematic diagram, of system S' that produces an HHO mix of fuel in vehicles that reduces exhaust emission and increases fuel efficiency according to another embodiment of the present invention. As shown in FIG. 14A, the system S' includes liquid and gas solution tank 212 connected to external pump 256 (which includes an internal check vale), heat exchanger with fan 216, HHO generators 218a and 218b, pressure tank 222 with a cutoff switch, magnet valve 224 (such as a solenoid), and check valve 226. As shown in FIG. 14B, electrical power supply 228 in an exemplary embodiment includes battery 230, circuit breaker 232 and main relay 234, which are connected to provide power to the components of system S' via fuse block 250. Circuit breaker 232 is an 80 amp circuit breaker in an exemplary embodiment. System S' also includes voltage generator 231, which in the embodiment shown is a hydraulic voltage generator, and relay 233, which are connected though bridge rectifier 238 to provide power to provide power to HHO generators 218a and 218b. Bridge rectifier 238 (and other components housed with bridge rectifier 238) is cooled by cooling fan 292

The operation of system S' is electrically controlled to operate when the vehicle is running. An ignition signal IGN is provided from the vehicle to enable power delivery, through fuse 280 and main relay 234, which is a normally on relay in an exemplary embodiment. Fuse 280 is a 10 amp fuse in an exemplary embodiment, to protect the vehicle fuse block. Main switch 262 is connected to main relay 234, and can be thrown on or off to enable or disable the system. For thermal protection, thermal switch 258 is connected between main switch 262 and reset relay 284. Thermal switch is set to open at a high temperature limit, such as at 170° F. in an exemplary embodiment, to protect the system for overheating. When thermal switch 258 is closed (that is, when the system temperature does not exceed the high temperature limit), reset relay 284 powers secondary relay 282 so that power is delivered to fuse block 250. Button 286 is provided to allow manual resetting of reset relay 284.

Fuse block 250 distributes power to a number of components, including intake manifold switch 252, magnet valve 224, heat exchanger 216 (illustrated in FIG. 14B as a fan for a radiator, for example), pump controller 254 and pump 256 connected to liquid and gas solution tank 212 (FIG. 14A), pressure cut-off switch 260 (which is part of pressure tank 222), meter 259 and indicator lamp 261, and cool down circuit 270. These components receive 12 volt electrical power, while HHO generators 218a and 218b receive a higher level of power for charging their steel plates, as explained in more detail below.

In operation of the embodiment shown in FIGS. 14A and 14B, 115 volt DC power is supplied to HHO generators 218a and 218b. HHO generators 218a and 218b may be implemented as series connected suspended steel plates in a fluid cell in an exemplary embodiment, as shown and described above with respect to FIGS. 2A, 2B and 3-5.

Liquid electrolyte solution, such as a solution of 95% water and 5% potassium hydroxide (KOH) by volume in an exemplary embodiment, is pumped from liquid solution and gas tank 212 into HHO generators 218a and 218b. HHO generators 218a and 218b are configured so that the liquid solution flows over charged core plates to break the chemical bonds of the water ($H_2O$) into a gas (HHO) made up of two parts hydrogen and one part oxygen. In an exemplary embodiment, the core plates are made of grade 316L stainless steel and are charged with 36 Ampere current by 115 Volt DC power from bridge rectifier 238. After treatment in HHO generators 118a and 118b, the HHO gas (as well as any residual liquid solution) flows through heat exchanger 216 that helps to cool the gas and solution. In an exemplary embodiment, heat exchanger 216 may include a radiator/fan assembly that starts when the system is activated, and cools the entire system. For example, the gas and liquid solution may be cooled below 115° F. in one embodiment. The gas and liquid solution then flows back into liquid solution and gas tank 212. The gaseous HHO alternative fuel is then separated from the liquid solution, such as by a filter, with the residual liquid solution settling to a lower part of the liquid solution and gas tank 212 while HHO gas moves upward in the tank, such as through a one-way valve.

The HHO gas then flows into pressure tank 222, where a small amount of pressure and a volume of gaseous fuel are accumulated, stored at a pressure that exceeds the ambient atmospheric pressure. A cut-off switch (pressure switch 260, FIG. 14B) installed with pressure tank 222 automatically shuts off the flow of fuel when a pressure threshold is reached in pressure tank 222, such as at about 12 pounds per square inch (psi) in one embodiment. Pressure is applied to fuel in pressure tank 222 to ensure that adequate HHO alternative fuel reserves are maintained and a steady and constant flow can be achieved.

Fuel flow from pressure tank 222 is controlled by magnet valve 224, which is implemented as a solenoid valve in an exemplary embodiment. Magnet valve 224 is controlled to open in response to the acceleration demand status of engine E, via a signal provided from intake manifold switch 252. Intake manifold switch 252 closes when engine E comes to an idle, by sensing a drop in pressure (such as pressure below 1.2 psi in an exemplary embodiment). Magnet valve 224 closes in response to closing of intake manifold switch 252, and the gas pressure builds until the pressure in pressure tank 122 reaches 12 psi, or magnet valve 124 opens again when engine E rises above idle. When the vehicle operates steps on the throttle and the vehicle turbo charger pressurizes, the intake manifold switch 252 opens and causes magnet valve 224 to open and cause a rush of HHO gas to be provided to the engine (about 20 liters in an exemplary embodiment), at exactly the time when the engine needs this boost the most (starting from a stopped condition). In general operating conditions, the volume of gas provided to the engine intake is related to the demand for fuel consumption, and a constant flow of HHO gas at a rate of 6-7 liters per minute when the vehicle is being driven over the road is typical.

Cool down circuit 270 is provided in system S' to provide additional thermal protection to the system. Cool down switch 290 is provided and configured to close when the system temperature reaches a cool down threshold temperature (lower than the high temperature limit associated with thermal switch 258, which shuts the entire system down). In an exemplary embodiment, the cool down threshold temperature may be 150° F., and cool down operation may be discontinued (and HHO gas generation resumed) when the system temperature has been cooled to 120° F. When the cool down threshold temperature is reached, cool down switch 290 closes and cooling fan 216 is controlled to reduce the temperature of the system. In addition, relay 294 is controlled to shut down HHO generators 218a and 218b during the cool down phase, and relay 296 is controlled to operate pump controller 254 and pump 256 so that pump 256 runs at an increased voltage level during cool down. In one example, pump 256 is operated at 7 volts (supplied by pump controller 254) during normal operation, and at 12 volts (supplied by fuse block 250) during cool down operation, to increase fluid flow during cool down.

In the manner described above, engine E is supplied with alternative fuel that improves the efficiency at which fuel is burned and consumed.

In an embodiment where engine E is a gasoline-powered engine, a safety bubbler may be provided just before HHO fuel reaches engine E to prevent flashback from the engine. This component is not needed in most embodiments in which engine E is a diesel-powered engine.

As the intake valve of engine E opens, pressurized gas (HHO alternative fuel) from pressure tank 222 starts filling the cylinder of engine E along with fresh air from the air filter. Gasoline or diesel fuel is also provided to the cylinder, although the addition of the HHO alternative fuel means that some amount of gasoline or diesel fuel is replaced by the HHO alternative fuel; that is, less gasoline or diesel fuel is provided to the cylinder than would normally be provided. The hydrogen provided to the cylinder (in the HHO alternative fuel) promotes a complete burn of all of the fuel in the combustion chamber, and the oxygen provided to the cylinder (in the HHO alternative fuel) promotes combustion and gives higher fuel efficiency. As a result, higher output power is obtained from the engine with less gasoline or diesel fuel being used.

While two HHO generators 218a and 218b are shown, in some embodiments a single HHO generator may be used, while in other embodiments a greater number of HHO generators may be used.

Figure 15:
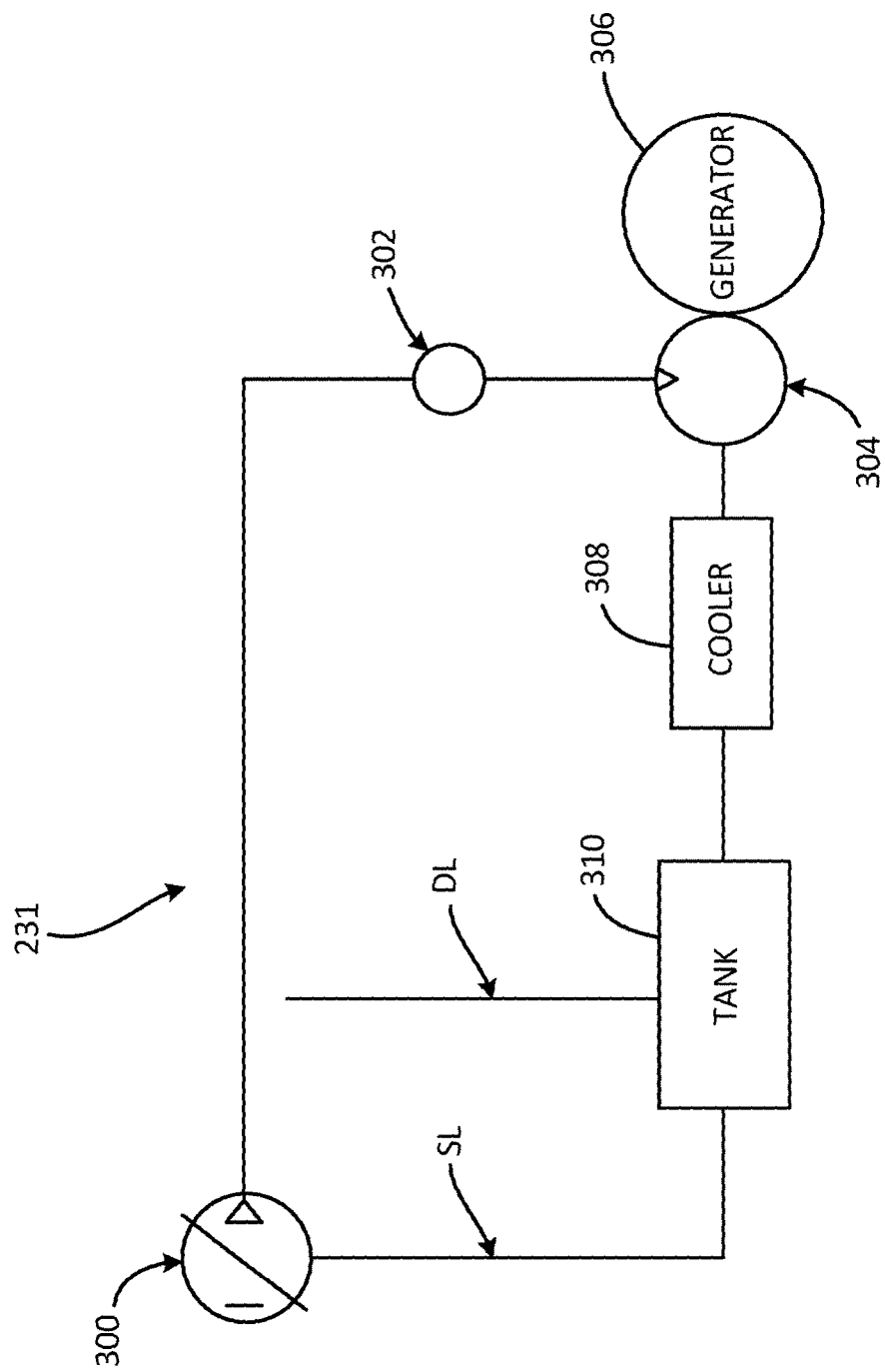
FIG. 15 is a schematic illustration of a hydraulic voltage generator utilized to provide power to HHO generators in an exemplary embodiment

FIG. 15 is a schematic illustration of hydraulic voltage generator 231 utilized to provide power to HHO generators 218a and 218b in an exemplary embodiment. Hydraulic voltage generator 231 includes hydraulic variable pressure compensator pump 300, filter 302, hydraulic motor 304 mechanically coupled to generator 306, cooler 308, and tank 310. In an exemplary embodiment, hydraulic variable pressure compensator pump 300 is a swash plate pump such as an MVP60 pump manufactured by Casappa S.p.A. of Parma, Italy. Hydraulic variable pressure compensator pump 300 pumps pressurized liquid through filter 302 to hydraulic motor, which is driven by generator 306. In an exemplary embodiment, generator 306 is a 5000 Watt generator, operating at 60 Hertz, 40 Amps and 120 Volts. Generator 306 is driven by the vehicle engine, and requires about 12 horsepower to properly drive hydraulic motor 304 and hydraulic variable pressure compensator pump 300. The liquid passes through cooler 308 and into tank 310, where it is drawn into hydraulic variable pressure compensator pump 300 via suction line SL (and drains back into tank 310 via drain line DL).

Example Data

Testing of the system described above was performed with a diesel semi tractor and trailer (an International 9000s with a 14L diesel engine) in a static test environment, with the performance of the vehicle being compared to a conservative assumption that the vehicle would get 6 miles per gallon without the addition of HHO. The performance of the system in the static tests was as shown below in Table 2:

TABLE 2

| TEST# | HOURS | TOTAL GAL.(S) | GAL PER HR | HHO LPM | MILES PER GAL @60 MPH | ESTIMATED MILES PER GAL W/O HHO | % DIFF |
|---|---|---|---|---|---|---|---|
| 1 | 4 | 14.64 | 3.66 | 4.50 | 16.39 | 6 | 36.60% |
| 2 | 2 | 14.10 | 7.05 | 4.50 | 8.51 | 6 | 70.50% |
| 3 | 2 | 9.18 | 4.59 | 5.50 | 13.07 | 6 | 45.90% |
| 4 | 1 | 6.53 | 6.53 | 5.50 | 9.19 | 6 | 65.30% |
| 5 | 2 | 14.29 | 7.15 | 4.50 | 8.40 | 6 | 71.45% |
| 6 | 2 | 14.35 | 7.18 | 5.00 | 8.36 | 6 | 71.76% |
| 7 | 2 | 14.00 | 7.00 | 6.00 | 8.57 | 6 | 70.00% |
| 8 | 2 | 13.10 | 6.55 | 5.75 | 9.16 | 6 | 65.50% |
| 9 | 2 | 6.62 | 3.31 | 5.50 | 18.13 | 6 | 33.10% |
| 10 | 2 | 14.59 | 7.30 | 5.50 | 8.22 | 6 | 72.95% |
| TOTALS | | 121.40 | | | 108.01 | | 603.06% |
| AVERAGES | | 12.14 | | | 10.80 | | 60.31% |

As shown by the data in Table 2, the HHO system described above resulted in greater than 33% improvement in fuel economy in every test, with an average improvement of over 60%. In on-the-road driving conditions, one should quite conservatively expect to see at least 30% improvement in fuel economy as a result of adding the HHO system described above to a semi tractor and trailer vehicle.

The system described above was also tested for its effect on emissions from the vehicle engine. Tables 3-7 below illustrate the results of this testing, which was also performed in a static test environment as noted above with respect to the testing data obtained in Table 2.

TABLE 3

| | W/O HHO | W/HHO | W/O HHO | W/HHO |
|---|---|---|---|---|
| | | TEST # | | |
| | 1 | 2 | 3 | 4 |
| TIME | 9:27 | 9:44 | 16:40 | 17:24 |
| EFFICIENCY % | 73.5 | 75.1 | 81.1 | 91.1 |
| AMB. TEMP F. | 68 | 69 | 81 | 72 |
| STACK TEMP F. | 199 | 186 | 177 | 110 |
| OXYGEN % | 18.4 | 18.5 | 18.1 | 15.4 |
| CO: PPM | 183 | 148 | 82 | 87 |
| CO2 % | 2.1 | 1.9 | 2.2 | 4.1 |
| HYDROCARBONS PPM | 5 | 0 | 1 | 6 |

TABLE 3-continued

|  | W/O HHO | W/HHO | W/O HHO | W/HHO |
|---|---|---|---|---|
|  | TEST # | | | |
|  | 1 | 2 | 3 | 4 |
| NO PPM | 400 | 390 | 555 | 97 |
| NO2 PPM | 68 | 73 | 73 | 56 |
| NOX PPM | 468 | 483 | 628 | 153 |
| SO2 PPM | 0 | 0 | 0 | 11 |
| EXCESS AIR % | 612 | 681 | 574 | 263 |
| AIR/FUEL RATIO | 92.78 | 103.7 | 92.63 | 43.76 |
| LAMBDA | 6.53 | 7.3 | 6.52 | 3.08 |
| EQUIVAL RATIO | 0.15 | 0.13 | 0.15 | 0.32 |
| FUEL | #2 DIESEL | #2 DIESEL | #2 DIESEL | #2 DIESEL |

TABLE 4

|  | W/O HHO | W/O HHO | W/HHO |
|---|---|---|---|
|  | TEST # | | |
|  | 5 | 6 | 7 |
| TIME | 12:53 | 12:58 | 15:52 |
| EFFICIENCY % | 85.2 | 90.8 | 83.9 |
| AMB. TEMP F. | 73 | 75 | 80 |
| STACK TEMP F. | 131 | 107 | 136 |
| OXYGEN % | 18.3 | 16.5 | 18.7 |
| CO: PPM | 76 | 162 | 107 |
| CO2 % | 2.1 | 3.3 | 1.7 |
| HYDROCARBONS PPM | 6 | 10 | 1 |
| NO PPM | 431 | 296 | 440 |
| NO2 PPM | 57 | 85 | 71 |
| NOX PPM | 488 | 381 | 511 |
| SO2 PPM | 0 | 0 | 0 |
| EXCESS AIR % | 609 | 352 | 770 |
| AIR FUEL/RATIO | 96.16 | 60.67 | 116.6 |
| LAMBDA | 6.77 | 4.27 | 8.21 |
| EQUIVAL RATIO | 0.14 | 0.23 | 0.12 |
| FUEL | #2 DIESEL | #2 DIESEL | #2 DIESEL |

TABLE 5

|  | W/O HHO | W/O HHO | W/HHO | W/HHO |
|---|---|---|---|---|
|  | TEST # | | | |
|  | 8 | 9 | 10 | 11 |
| TIME | 18:11 | 18:11 | 19:06 | 19:07 |
| EFFICIENCY % | 82.4 | 82.9 | 83.2 | 84 |
| AMB. TEMP F. | 77 | 77 | 74 | 74 |
| STACK TEMP F. | 143 | 142 | 141 | 147 |
| OXYGEN % | 18.7 | 18.4 | 18.6 | 18.2 |
| CO: PPM | 128 | 132 | 127 | 103 |
| CO2 % | 1.6 | 1.8 | 1.8 | 2.1 |
| HYDROCARBONS PPM | 5 | 6 | 1 | 1 |
| NO PPM | 447 | 458 | 468 | 562 |
| NO2 PPM | 70 | 69 | 79 | 90 |
| NOX PPM | 517 | 527 | 547 | 652 |
| SO2 PPM | 0 | 0 | 0 | 0 |
| EXCESS AIR % | 815 | 712 | 722 | 606 |
| AIR FUEL/RATIO | 119.1 | 106.3 | 109.5 | 95.9 |
| LAMBDA | 8.38 | 7.48 | 7.71 | 6.75 |
| EQUIVAL RATIO | 0.11 | 0.13 | 0.12 | 0.14 |
| FUEL | #2 DIESEL | #2 DIESEL | #2 DIESEL | #2 DIESEL |

TABLE 6

|  | W/O HHO | W/O HHO | W/HHO | W/HHO |
|---|---|---|---|---|
|  | TEST # | | | |
|  | 12 | 13 | 14 | 15 |
| TIME | 19:58 | 20:00 | 20:27 | 20:28 |
| EFFICIENCY % | 78.9 | 78 | 78.7 | 76.8 |
| AMB. TEMP F. | 56 | 57 | 56 | 56 |
| STACK TEMP F. | 149 | 154 | 157 | 157 |
| OXYGEN % | 18.5 | 18.5 | 18.4 | 18.6 |
| CO: PPM | 76 | 115 | 58 | 80 |
| CO2 % | 1.9 | 1.7 | 1.9 | 1.8 |
| HYDROCARBONS PPM | 4 | 5 | 2 | 3 |
| NO PPM | 613 | 500 | 661 | 527 |
| NO2 PPM | 98 | 80 | 98 | 96 |
| NOX PPM | 711 | 580 | 759 | 623 |
| SO2 PPM | 0 | 0 | 0 | 0 |
| EXCESS AIR % | 680 | 761 | 646 | 686 |
| AIR FUEL/RATIO | 105.9 | 113.5 | 102.9 | 106.7 |
| LAMBDA | 7.45 | 7.95 | 7.24 | 7.51 |
| EQUIVAL RATIO | 0.13 | 0.12 | 0.13 | 0.13 |
| FUEL | #2 DIESEL | #2 DIESEL | #2 DIESEL | #2 DIESEL |

TABLE 7

|  | W/O HHO | W/O HHO | W/HHO | W/HHO |
|---|---|---|---|---|
|  | TEST # | | | |
|  | 16 | 17 | 18 | 19 |
| TIME | 14:56 | 14:57 | 15:24 | 15:25 |
| EFFICIENCY % | 74.5 | 74.1 | 71.6 | 68.3 |
| AMB. TEMP F. | 76 | 76 | 83 | 82 |
| STACK TEMP F. | 232 | 233 | 229 | 226 |
| OXYGEN % | 17.8 | 17.9 | 18.4 | 18.8 |
| CO: PPM | 143 | 136 | 134 | 142 |
| CO2 % | 2.3 | 2.3 | 1.9 | 1.7 |
| HYDROCARBONS PPM | 0 | 0 | 0 | 0 |
| NO PPM | 527 | 524 | 513 | 428 |
| NO2 PPM | 75 | 79 | 94 | 96 |
| NOX PPM | 602 | 603 | 607 | 524 |
| SO2 PPM | 0 | 0 | 0 | 1 |
| EXCESS AIR % | 566 | 544 | 676 | 773 |
| AIR FUEL/RATIO | 89.65 | 86.95 | 103.9 | 115.2 |
| LAMBDA | 6.31 | 6.12 | 7.31 | 8.11 |
| EQUIVAL RATIO | 0.15 | 0.16 | 0.13 | 0.12 |
| FUEL | #2 DIESEL | #2 DIESEL | #2 DIESEL | #2 DIESEL |

As can be seen from the test results in Tables 3-7 above, the addition of HHO gas in many of the test resulted in significant reductions in the emission of various exhaust gases, some of which are particularly desirable to be controlled, such as hydrocarbons, carbon monoxide and NO gases, for example. The more complete combustion that is promoted by the addition of HHO gas is expected to result in cleaner vehicle exhaust conditions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A system for providing HHO gas to an internal combustion engine in a vehicle, comprising:
a power supply;
at least one HHO generator configured to receive a liquid electrolyte solution and output HHO gas, the at least one HHO generator including an HHO generating structure having a plurality of parallel plates suspended in a fluid compartment in a functionally parallel configuration such that the liquid electrolyte solution received by the HHO generator in the fluid compartment at least partially submerges each of the parallel plates at the same time, with current applied to each of the parallel plates in parallel;
a liquid solution and gas tank coupled to the at least one HHO generator, configured to hold the liquid electrolyte solution and to separate the HHO gas from residual liquid electrolyte solution output from the HHO generator, and to cooperate with a pump to pump the liquid electrolyte solution to the at least one HHO generator;
a pressure tank coupled to receive the HHO gas from the liquid solution and gas tank and store a quantity of the HHO gas at a pressure level exceeding an ambient atmospheric pressure;
a valve structure coupled to the pressure tank to selectively deliver the HHO gas to an intake side of the internal combustion engine based at least in part on a throttle signal of the internal combustion engine; and
a hydraulic voltage generator connected to supply electrical power to the at least one HHO generator.

2. The system of claim 1, further comprising:
a heat exchanger assembly coupled between the liquid solution and gas tank and the at least one HHO generator for selectively cooling the liquid electrolyte solution.

3. The system of claim 2, wherein the heat exchanger assembly is operable to cool the liquid electrolyte solution below 115° F.

4. The system of claim 1, wherein the liquid electrolyte solution is made up of 95% water and 5% potassium hydroxide (KOH) by volume.

5. The system of claim 1, wherein the pressure tank includes a cut-off switch configured to automatically shut off a flow of HHO gas when a pressure threshold is reached.

6. The system of claim 5, wherein the pressure threshold is about 12 pounds per square inch (psi).

7. The system of claim 1, wherein HHO gas is prevented from flowing from the pressure tank to the internal combustion engine when the engine is in an idle condition.

8. The system of claim 1, wherein the rate at which the HHO gas from the pressure tank flows to the internal combustion engine in response to acceleration of the internal combustion engine is about 0.5 liters per minute of HHO gas for every liter of displacement of the internal combustion engine.

9. The system of claim 1, wherein the valve structure comprises a magnet valve.

10. The system of claim 1, further comprising a cool down circuit operable to shut down operation of the at least one HHO generator and adjust operation of the pump in response to the system reaching a temperature exceeding a threshold temperature.

11. The system of claim 1, wherein the hydraulic voltage generator comprises:
a generator driven by the internal combustion engine of the vehicle;
a hydraulic motor mechanically coupled to the generator;
a hydraulic variable pressure compensator pump configured to selectively pump pressurized fluid to the hydraulic motor; and
a tank connected to receive the pressurized fluid from the hydraulic motor and to supply fluid to the hydraulic variable pressure compensator pump.

12. A method of providing HHO gas to an internal combustion engine in a vehicle, the method comprising:
providing a liquid electrolyte solution to at least one HHO generator having an HHO generating structure that includes a plurality of parallel plates suspended in a fluid compartment and configured to produce and output HHO gas therefrom, the plurality of parallel plates being arranged in a functionally parallel configuration such that the liquid electrolyte solution provided to the HHO generator in the fluid compartment at least partially submerges each of the parallel plates at the same time, with current applied to each of the parallel plates in parallel;
separating residual electrolyte solution from the HHO gas output by the HHO generator;
storing a quantity of the HHO gas in a pressure tank at a pressure level exceeding an ambient atmospheric pressure;
regulating a rate at which the HHO gas from the pressure tank flows to the internal combustion engine with a valve structure controlled at least in part by a throttle control signal of the internal combustion engine; and
supplying electrical power to the at least one HHO generator with a hydraulic voltage generator and supplying electrical power to other components with a separate power supply.

13. The method of claim 12, further comprising selectively cooling the liquid electrolyte solution.

14. The method of claim 13, wherein selectively cooling the liquid electrolyte solution comprises cooling the liquid electrolyte solution below 115° F.

15. The method of claim 12, wherein storing a quantity of the HHO gas in the pressure tank at the pressure level exceeding the ambient atmospheric pressure comprises automatically shutting off a flow of the HHO gas to the pressure tank when the pressure level is reached.

16. The method of claim 15, wherein the pressure level is about 12 pounds per square inch (psi).

17. The method of claim 12, wherein HHO gas is prevented from flowing from the pressure tank to the internal combustion engine when the engine is in an idle condition.

18. The method of claim 12, wherein a rate at which the HHO gas from the pressure tank flows to the internal combustion engine in response to acceleration of the internal combustion engine is about 0.5 liters per minute of HHO gas for every liter of displacement of the internal combustion engine.

19. The method of claim 12, wherein regulating the rate at which the HHO gas from the pressure tank flows to the internal combustion engine with the valve structure comprises opening and closing a magnet valve in response to the throttle control signal of the internal combustion engine.

20. The system of claim 1, wherein the hydraulic voltage generator is configured to provide a first voltage to the at least one HHO generator, and the power supply is configured to provide a second voltage to other components of the system, the first voltage being greater than the second voltage.

21. The system of claim 20, wherein the first voltage provided to the at least one HHO generator is 115 volts and the second voltage provided to other components of the system is 12 volts.

\* \* \* \* \*